June 6, 1967 L. H. KLAUER ETAL 3,323,620
BRAKE DRUM
Filed July 30, 1965
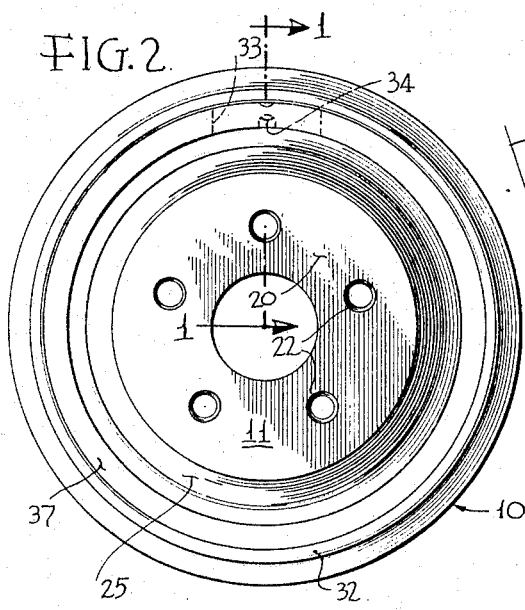
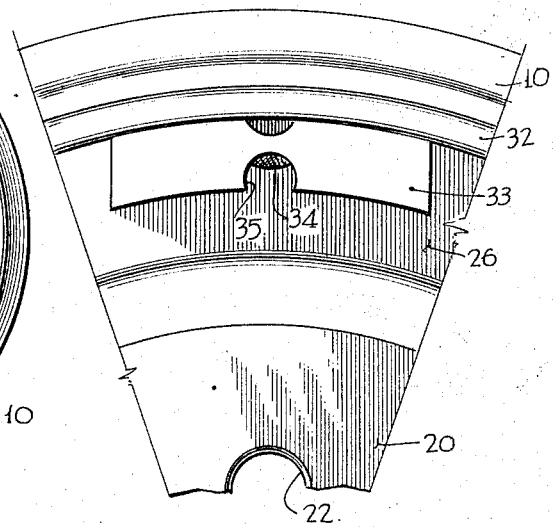
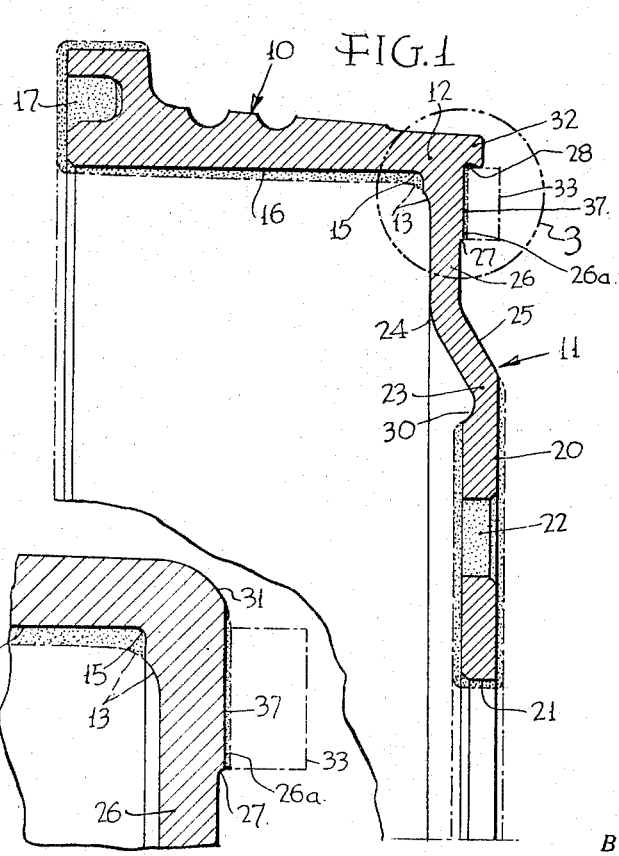
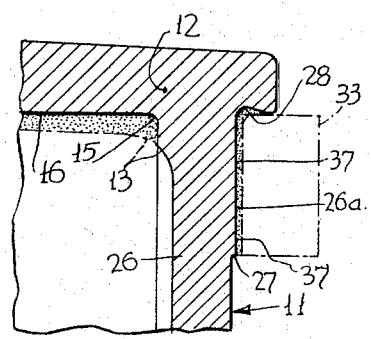
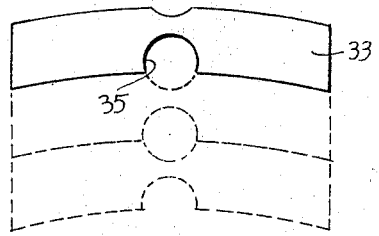
INVENTORS.
Leslie H. Klauer
Walter R. McLure.
BY John B. Sowell
ATTORNEY

United States Patent Office 3,323,620
Patented June 6, 1967

3,323,620
BRAKE DRUM
Leslie H. Klauer and Walter R. McLure, Detroit, Mich., assignors to The Budd Company, Philadelphia, Pa., a corporation of Pennsylvania
Filed July 30, 1965, Ser. No. 476,007
6 Claims. (Cl. 188—218)

This invention relates to a brake drum, particularly to an integral all-cast brake drum, and method of making it and has for an object the provision of improvements in this art.

For present-day automotive use there are two main types of brake drums, the all-cast drum and the composite drum.

The all-cast drum has been used for a long time but because of excessive breakage due to unusual stress concentrations, especially at machine cuts at bends and fillets, for some time has largely been replaced by the composite drum. The patent to Eksergian 2,162,072 shows one example of a composite drum, comprising a preformed stamped steel head or end disk having a drum proper cast on its outer peripheral edges.

Composite drums have given considerable trouble in that the bond between the head and the cast drum may loosen, that the strength for axial loading is not as great as desired, and that there may be considerable chattering when the brakes are strongly applied.

The all-cast brake drum has experienced much breakage at the bend where the drum proper joins the head. It has been the practice in finishing the drum to make a cut beyond the inner curved radius or fillet of cast metal in shaping the braking surface and this has been a source of incipient breakage. According to the present invention, the bend or fillet is recessed beyond the point where the brake shoes operate and the machine cut is stopped short of the inner portion of the curve of the fillet so that at a main point of incipient breakage the original cast surface is left intact and the machined sub-fillet is ground smooth like the braking surface so there is no rough cut to form a point of incipient breakage.

The drum head of the all-cast brake drum is relatively thick to take the imposed axial loads but needs to have some flexibility so as to avoid undue stiffness and breakage from such stiffness, so a flexible zone is provided between the inner radial attachment zone and an otuer generally radial portion. According to the present invention, an annular groove is provided which lies below the machine finish line and the machining cut does not extend into the lower curved portion of the groove, thereby avoiding an incipient line of breakage here.

A third point of trouble with all-cast brake drums has been the weld points near the outer radius of the bend between the head and drum proper where balance weights were welded on. These weld points set up a change in the cast metal grain structure which form incipient points of breakage. According to the present invention, an annular axially extending rib is provided at the bend which forms a radial barrier within which balance weights can be secured and also strengthens the drum at the turn angle between the head and the drum proper. The weights are welded to the head at their inner edges, well away from the outer edge of the head, where there are no heavy concentrated loads to start breaks. There is an added thickness of metal near the outer periphery of the head to take bending loads concentrated here and when machined to take weights, the fillets are largely preserved.

The general and specific objects of the invention, as well as various novel features and advantages, will be apparent from the following description of certain exemplary embodiments, reference being made to the accompanying drawings, wherein:

FIG. 1 is a partial axial section of a brake drum embodying the invention;
FIG. 2 is a reduced-size right end elevational view of the parts shown in FIG. 1;
FIG. 3 is an enlarged partial section in the circle "3" of FIG. 1;
FIG. 4 is an enlarged partial end view showing an attached weight;
FIG. 5 is a diagram showing how weights are stamped from a strip of metal;
FIG. 6 is a view like FIG. 3 but showing a modified form which has no weight-retaining rib or flange.

The brake drum shown comprises an annular drum proper 10 and an integral head or end disk 11 cast as a continuous homogeneous unit therewith. The cast shape, where excess metal is provided for subsequent machining away, is shown in broken lines, with removed metal stippled, and the finished drum is shown in full lines. At the turn junction or corner 12 between the head and the drum proper, the original casting is formed with a fillet or inner radius 13 which extends axially beyond the point where the fillet 15 of the machined (cut and ground) braking surface 16 is located. The machined fillet is ground smooth like the braking surface. This insures that the original cast metal on the inner portion of this inner radius or fillet is left uncut and the machined surface left without scored cut lines, thus avoiding an incipient point of breakage here.

The outer end of the drum proper is machined out at 17 to form a sealing groove but this is not related to the present invention.

The head has an inner attachment portion 20 which is cast with excess thickness, as indicated, so it can be machined away to a thinner section with parallel sides for attachment to a wheel hub and disk assembly. A large central hub hole 21 and a plurality of lug bolt holes 22 are provided in the central attachment portion 20.

Outside the central attachment portion 20 there is an annular flexing portion 23 and beyond that an annular connecting portion 24 which, in general, is approximately radial but which here is formed with a slightly inclined portion 25 to give added strength and rigidity. The more strictly radial outer portion 26 connects at an angular bend with the outer drum proper.

According to the present invention, the flexible portion 23, on the inner side of the angular bend connection between the inner attachment portion 20 and the inclined portion 25, is provided with a relatively deep and relatively wide groove 30 having its curved fillet-like bottom disposed completely below the level where a machining cut will be made in finishing the inner attachment portion. This leaves the surface of the original cast metal entirely uncut at the curved point of flexure and hence there will be no point of incipient breakage.

It may be desired to make provision for retaining balance weights, and in this case, according to the present invention, there is provided an annular axially extending overhanging rib or flange 32, the outer surface of which forms an extension of the outer surface of the outer periphery of the drum.

The head is made with an added thickness 26a near the outer periphery with a cast fillet 27 at its inner edge and an outer cast fillet 28 at the rib or flange 32.

Weights 33 (one shown) are secured at any place desired or required within the inner periphery of the axial rib 32. The rib 32, when present, retains the weights against centrifugal detachment so that it is only necessary to secure them lightly, as by a plug weld 34, to hold them in place. This plug weld is preferably made in a recess 35 formed on the inner side of the weight.

This places the weld at a distance inward from the bend on the web where a change in grain structure due to welding will be well away from the zone of high stress concentration. Due to the fact that the weld does not have to hold the weight against centrifugal separation, as with weights secured to the outer periphery only by welds, the welds may be very small, further reducing the possible impairment of the cast metal structure of the drum.

The weights may be formed by stamping from a strip, as shown in FIG. 5, the line of cutting being through a weld receiving hole in a position to leave the major part of the hole in the inner edge of the weight and the smaller portion on the outer edge. This leaves one side of the large inner portion of the hole freely accessible for making the weld.

The rounded fillet 28 is located where a machine cut, which is made to provide the flat finish surface 37 for the weights, forms a smooth extension of the bottom of the curve, thus avoiding a point of incipient breakage here. The inner portion of the inner cast fillet 27 is preserved when the finish cut is made.

The form shown in FIG. 6 does not have the weight-retaining rib or flange 32 and the corner is cast with a smooth outer curve 31. The cut for the weights 33 preserves part of the inner fillet 27, as before, and at the outer edge dies out on the curve 31, leaving no undercut portion.

The loads on the outside of the drum unit are largely compressive but it is still helpful to avoid sharp points of incipient breakage on the outside, as described above. On the inner side of the drum unit the loads are largely in tension and the preserved cast fillet surfaces hereby provided are even more useful here.

It has been found by repeated tests that brake drums made according to the present invention give much better and longer service than comparable composite drums or cast drums which are made without the present features. The present drums continued in service after breakage occurred with other types of drums; and even after the braking surface was enlarged by reboring after brake wear, there was no breakage; whereas breakage after reboring was especially high with other types of drums.

It is thus seen that the present invention provides an improved brake drum and an improved method of making it so as to provide greater strength and longer life without breakage.

While one embodiment and a detail modification of the invention have been described for purposes of illustration, it is to be understood that there may be various embodiments and modifications within the general scope of the invention.

I claim:
1. A full cast brake drum comprising a disk shaped head portion having a central attachment portion, an annular flexing portion, an axially and radially inclined portion, a radially outer web portion, and an added thickness portion on said radially outer web portion, a cylindrical shaped drum portion connected to said head portion at said web portion, a first cast fillet at the inner cast surface of the junction between said head portion and said web portion, and, a cast concave groove at the inner surface of said annular flexing portion adjacent said head portion, the brake drum at said cast fillet and said cast groove being provided with an excess of metal whereby subsequent final machinery of the drum does not remove the cast fillet and groove at their points of maximum stress.

2. A full cast brake drum as set forth in claim 1 wherein said cast concave groove at said annular flexing portion of said head portion is of less thickness than the remainder of said head portion.

3. A full cast brake drum as set forth in claim 2 which further includes an annular flange at the outer radial end of said radially outer web portion and forming an axial extension of said drum portion.

4. A full cast brake drum as set forth in claim 3 which further includes a first machined fillet at the junction of said head portion and said drum portion located radially outward and axially disposed from said first cast fillet.

5. A full cast brake drum as set forth in claim 4, which further includes a second cast fillet at the outer cast surface of the connection between said outer thickness portion and said web portion.

6. A full cast brake drum as set forth in claim 5 which further includes a second machined fillet at the junction of said annular flange and said outer thickness portion on said radially outer web portion.

References Cited

UNITED STATES PATENTS

| | | | |
|---|---|---|---|
| 1,800,883 | 4/1931 | Booth | 188—218 |
| 1,892,606 | 12/1932 | Bourdon. | |
| 1,925,598 | 9/1933 | Nelson | 188—218 |
| 1,954,665 | 4/1934 | Dake. | |
| 2,262,604 | 11/1941 | Eksergian | 188—218 |
| 2,740,502 | 4/1956 | Butterfield | 188—218 X |

FOREIGN PATENTS

| | | |
|---|---|---|
| 472,079 | 3/1951 | Canada. |
| 615,926 | 1/1961 | Italy. |

MILTON BUCHLER, *Primary Examiner.*

G. E. HALVOSA, *Assistant Examiner.*